(No Model.) 2 Sheets—Sheet 1.

S. L. BEAN.
DUST COLLECTOR FOR FLOUR MILLS.

No. 258,878. Patented June 6, 1882.

Witnesses:
Chas. S. Hyer
C. H. Neale

Inventor:
Samuel L. Bean
by his attorneys
Giles Doolittle (No Model.) 2 Sheets—Sheet 2.
S. L. BEAN.
DUST COLLECTOR FOR FLOUR MILLS.
No. 258,878. Patented June 6, 1882.
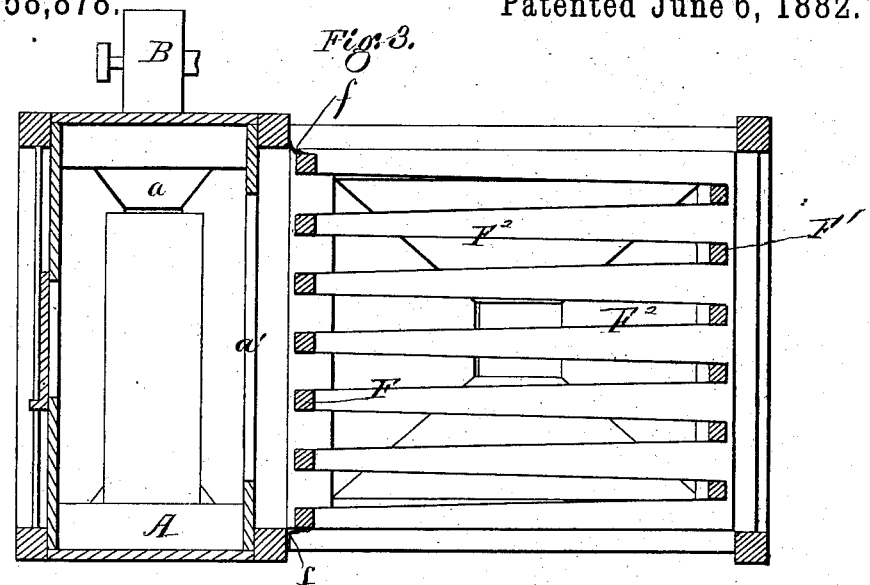
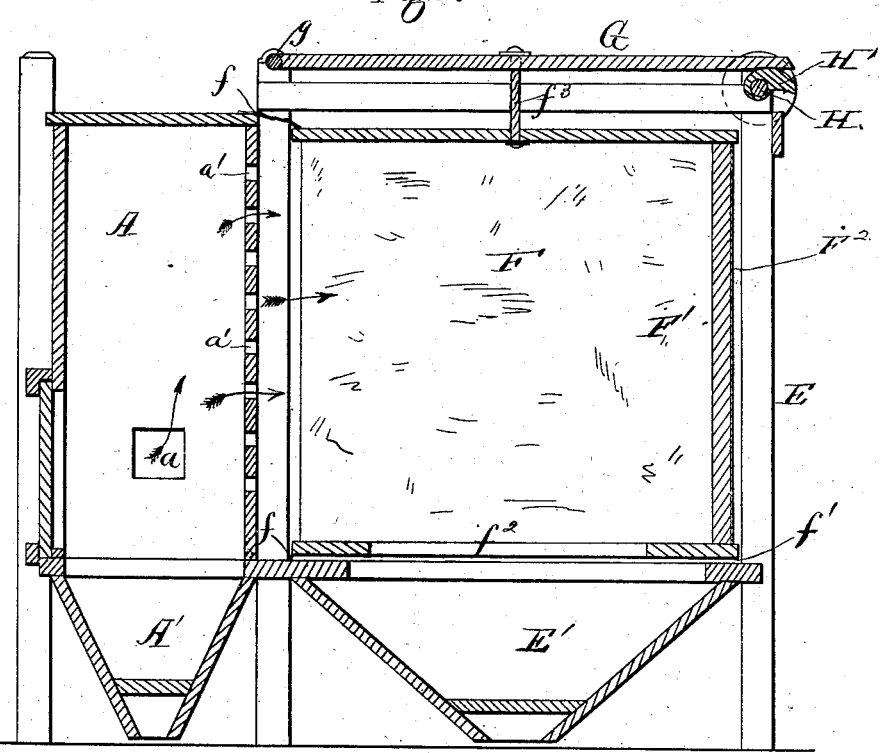
Witnesses: Chas. S. Hyer
Inventor: Samuel L. Bean by his attorneys

UNITED STATES PATENT OFFICE.

SAMUEL L. BEAN, OF WASHINGTON, DISTRICT OF COLUMBIA.

DUST-COLLECTOR FOR FLOUR-MILLS.

SPECIFICATION forming part of Letters Patent No. 258,878, dated June 6, 1882.

Application filed December 31, 1880. (No model.)

*To all whom it may concern:*

Be it known that I, SAMUEL L. BEAN, a citizen of the United States, residing at Washington, District of Columbia, have invented certain new and useful Improvements in Dust-Collectors for Flour-Mills; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to devices for separating and collecting dust from dust-laden air of milling machinery in grinding-mills generally, but more especially in flouring-mills, as applied to which latter my invention will be described.

My improvement in dust-collectors consists in combining a settling chamber or room with a separator or screen, the dust-laden air passing through the settling-chamber on its way to the separator or screen, so that a portion of the dust may be deposited in said settling-chamber, and thereby the duty of the separator or screen considerably lessened, in consequence of which a smaller separator or screen may be used for a given amount of work and the meshes of the reticulated cloth thereof can be more easily kept open.

It further consists of a separator or screen jarred at intervals in vertical direction, preferably by a lift-and-fall action.

It further consists of details of construction specifically set forth in claims at the close of this specification.

In order that my invention may be clearly understood, I have illustrated in the annexed drawings and will proceed to describe the form thereof originally devised by me, and which is a practical embodiment of the same; but it should be distinctly understood at the outset that my invention, in its broad scope, is not limited to this particular form, in further explanation whereof I shall also refer to some modifications of the same.

Figure 1:
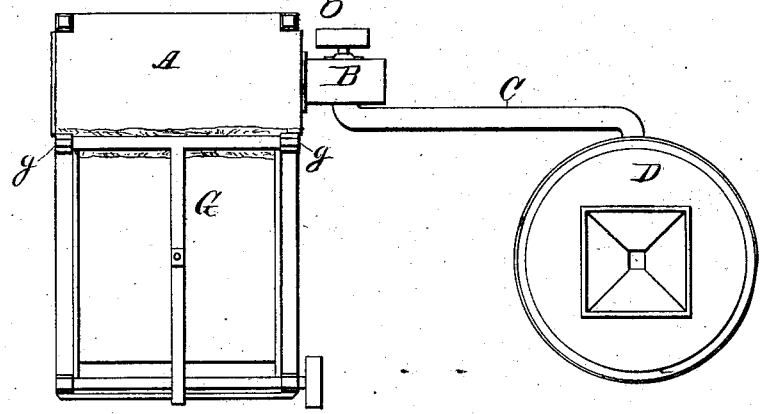
Figure 2:
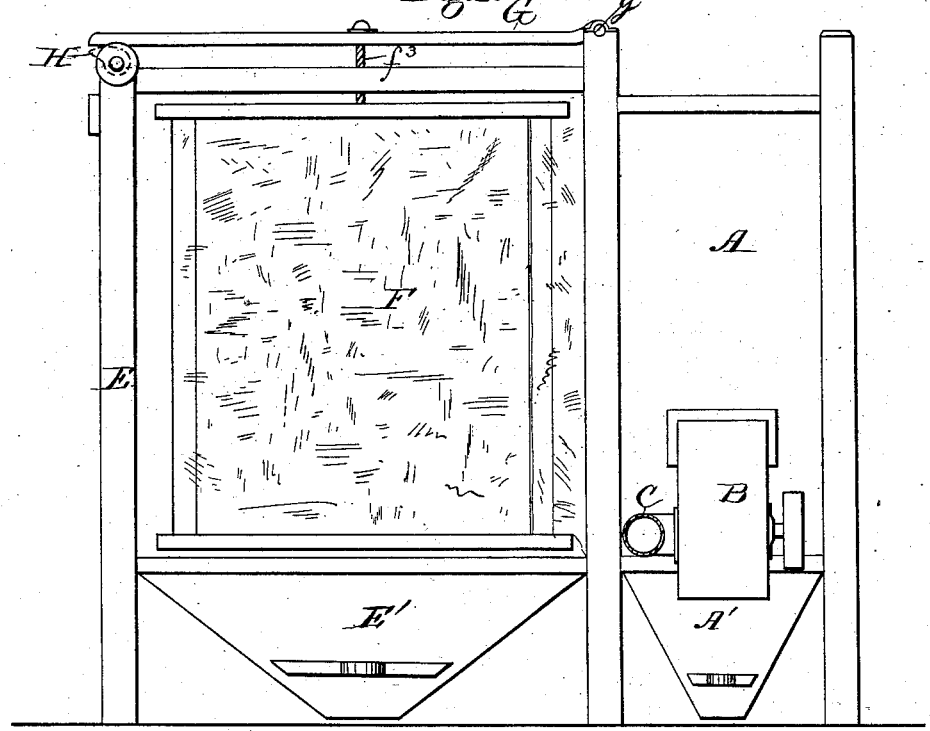

Figure 1 is a plan view of my improved dust-collector, showing its connection with a machine in a flouring-mill. Fig. 2 is an end elevation of the dust-collector. Fig. 3 is a horizontal section of the same. Fig. 4 is a vertical longitudinal section thereof.

Fig. 1 is drawn on a smaller scale than the remaining figures; but in all the figures the same letters of reference are used in the marking of identical parts.

A refers to the settling-chamber, into which the dust-laden air is conducted through the opening $a$ in one end thereof. The dust-laden air may be drawn by a fan, B, through an air-trunk, C, from the machine D, if there is not a sufficient air-pressure in said machine, and blown into the settling-chamber. On entering said chamber the air will at once expand, and the onward current will be in a great measure neutralized, so that the heavier portions of the dust suspended in the air will fall to the bottom of said settling-chamber and be received in a hopper, A', from which the settled dust may be removed in any manner. One side of this settling-chamber has a number of long slots, $a'$, for the escape of the air from it, and against this side is placed an open frame-work, E, constructed with a hopper-bottom, E'. Above this hopper-bottom, and within the frame-work, is arranged a separator or screen, F, which consists of top and bottom heads, with intervening rails, F', arranged in zigzag manner, as shown clearly in Fig. 3, the rails at one end of the separator being connected to the rails at the other end by reticulated cloth $F^2$ of proper fineness of mesh to separate fine flour-dust from dust-laden air by allowing the air to pass through the meshes, while the flour-dust is retained.

The rails may be connected by separate pieces of cloth; or a single long piece of cloth may be passed from rail to rail to form a continuous cloth screen. This separator covers all the slots $a'$ in the side of the settling-chamber. Slack pieces of cloth $f$ are used to connect the top, sides, and bottom of the separator to the settling-chamber in such a manner that no air can pass from the latter without being subjected to screening by the cloth of the separator. A similar slack piece of cloth, $f'$, should connect the bottom of the separator with the top of the hopper E'. The lower head of the separator is provided with a large opening, $f^2$, through which the separated dust can fall into hopper E', to be removed therefrom in any preferred or convenient manner. The separator or screen normally rests upon the top of the hopper E'. In order that the meshes of the cloth F² may be kept open, the flour-dust is every now and then shaken from it by lifting the separator a little and then letting it suddenly fall, thus jarring it. To this end the separator is connected by a rod or chain or rope, f³, with a lever, G, pivoted at g g to the frame E, and extending with its free end over a cam or lifter, H', on a revolving shaft, H, mounted on the frame E. The shaft H is preferably revolved by power, but may be turned by hand, as occasion requires, if deemed preferable. The lifter H', operating on lever G, causes the lever to lift the separator. As the lifter escapes from the lever the separator falls suddenly with a thud, so jarring it that the dust will be shaken from the cloth.

By the employment of a series of air-escape slots in the side of the settling-chamber the air is more evenly distributed over the cloth surfaces of the separator or screen.

Instead of arranging the separator directly against the side of the settling-chamber, the two may be widely separated, in which case it would probably be expedient to use a fan between them to carry the air from the latter to the former in case the air-pressure from the machinery is too weak.

The form of the separator may also be greatly changed. Lift-and-let-fall mechanisms of any known kind other than that shown and described may be used without departing from the principle of this part of my invention, which consists broadly in jarring the separator or screen in vertical directions, so that the dust will be less likely to sift through the cloth than if the separator were jarred horizontally by a knocker or other similar means. This vertical jarring might be effected by knocking the frame in vertical directions and without a lift and let fall; but, as already stated, I prefer the lift-and-let-fall action. The effect of such vertical jarring of the separator or screen is to slightly contract it in vertical directions, (the spring of the bars F' permitting such contraction,) and it will immediately expand again by its own resiliency, so as to impart a snapping action to the cloth. This contraction and expansion of the screen, resulting in the snapping of the cloth, may be effected by mechanism which does not jar the same by letting it fall or by striking it.

The dust may be removed from the hopper by conveyers; or the hopper may be dispensed with and a mere spout issue through a flat floor under the settling-chamber and separator, revolving flights or scrapers being used to push the dust over the flat floor into the spout.

The separator or screen frame may be fitted at the points where the slack pieces of cloth f f are shown sufficiently snug in cleats of the frame E to make practically air-tight joints, in which case the slack pieces of cloth may be dispensed with.

The up and down motions of the screen cause different portions of the cloth to be successively subjected to the direct currents from the slots a', which has the advantage that the dust will be more evenly distributed on the cloth, and not be packed against it in belts, as would be the case more or less if the screen were stationary and the direct currents from the slots always impinged against the same belts of the cloth. Another advantage of this shifting of the screen with respect to the direct air-currents is that the dust is more easily detached from the cloth along the belts not subjected to the direct currents at the time of the jarring of the screen or the snapping of the cloth. The same advantages would be obtained by movements of the air-ports with respect to a stationary screen.

The dust collected in the settling-chamber is heavier and of a better quality than the dust collected by the separator or screen. The dust is thus graded in the act of collecting it, which is quite important, since the higher grade of dust has considerably greater mercantile value as compared with ungraded dust, including both the higher and lower grade, because such better grade can be utilized in mixing with low grades of flour.

I am aware that flour-bolts have been jarred in vertical directions, and therefore do not broadly claim the jarring of a screen in that way. This part of my invention is clearly distinguishable by the facts that the screen is used for straining dust from dust-laden air-currents and that the dust so strained off is caught in a receptacle on that side of the screen against which the dust-laden air-currents impinge.

The forms of my invention not illustrated in the annexed drawings are described or alluded to simply for the purpose of indicating the scope of my claims, and to have it understood that I regard such forms as subordinate to such claims. As I do not desire, and probably would not be allowed under the existing rules of practice in the United States Patent Office, to specifically claim each separate described form of the invention in this patent, it is unnecessary to illustrate by drawings more than one practical form.

Having thus described my invention, what I claim as new is—

1. For separating and collecting dust from dust-laden air in grinding-mills, the combination, substantially as before set forth, of an anti-settling chamber and an air-straining separator or screen communicating therewith and designed to strain all remaining dust from the air before the air escapes.

2. For separating and collecting dust from dust-laden air in grinding-mills, the combination, substantially as before set forth, of a settling-chamber and a separator or screen communicating by a series of slots.

3. The combination, substantially as before set forth, of a screen for separating dust from dust-laden air-currents in grinding-mills, a means for jarring the screen in vertical directions to shake the dust therefrom, and a dust-receptacle on that side of the cloth against which the dust-laden air-currents impinge to be screened.

4. The combination, substantially as before set forth, of a vertical dust-laden air-straining screen constructed with elastic-cloth rails, and means for periodically contracting said screen vertically and permitting it to expand resiliently, whereby a snapping of the cloth of the screen is effected.

5. The combination, substantially as before set forth, of a screen for separating dust from dust-laden air-currents in grinding-mills, a lift-and-let-fall mechanism for jarring the screen in vertical directions to shake the dust therefrom, and a dust-receptacle on that side of the cloth against which the dust-laden air-currents impinge to be screened.

6. The combination, substantially as before set forth, of a separator or screen, a series of air-ports, and means for moving the former with respect to the latter.

In testimony whereof I affix my signature in presence of two witnesses.

SAML. L. BEAN.

Witnesses:
 C. A. NEALE,
 C. S. HYER.